July 29, 1952     J. H. RHOADS ET AL     2,604,802
ADJUSTABLE RAMP FOR TIRE CHAIN APPLICATION
Filed Feb. 17, 1951     2 SHEETS—SHEET 1
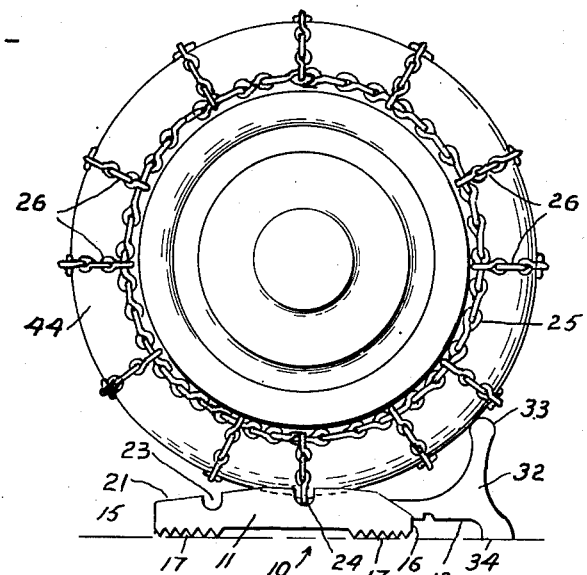
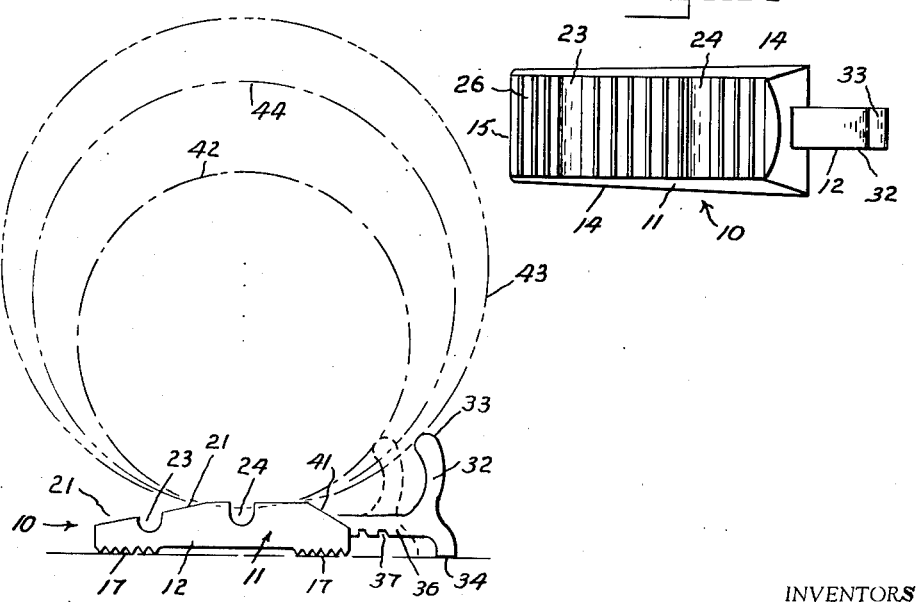
INVENTORS
John H. Rhoads
Louis F. Horvath,
BY Gustave Miller
ATTORNEY

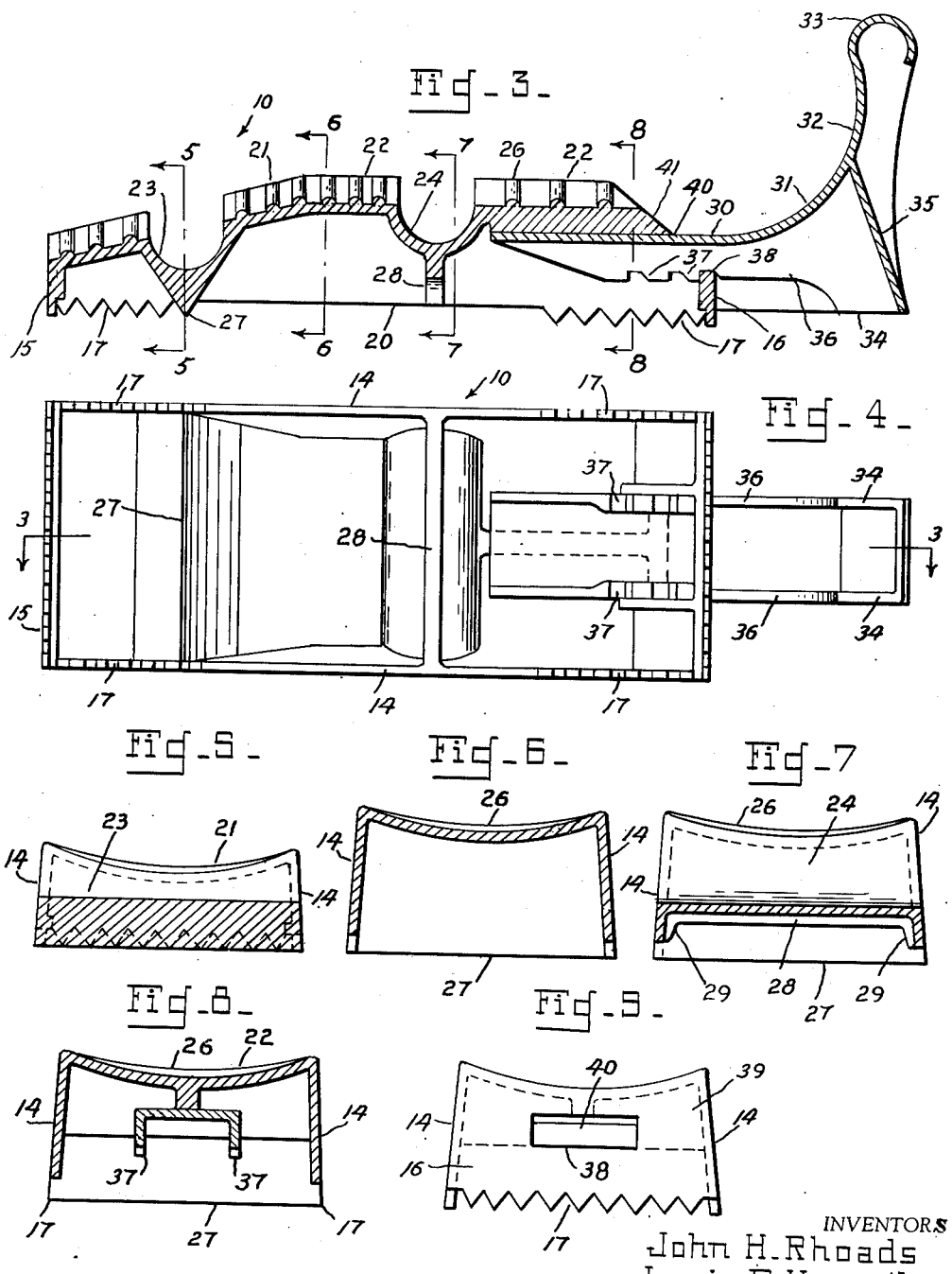

Patented July 29, 1952

2,604,802

UNITED STATES PATENT OFFICE 2,604,802

ADJUSTABLE RAMP FOR TIRE CHAIN APPLICATION

John H. Rhoads, Reading, and Louis F. Horvath, McAdoo, Pa.

Application February 17, 1951, Serial No. 211,526

2 Claims. (Cl. 81—15.8)

This invention relates to an adjustable ramp for tire chain application and has for an object to provide a tire chain applicator for facilitating the application of tire chains to automobile and truck wheels. This application is a continuation in part of application Serial No. 130,506, filed December 1, 1949, which was copending herewith and is now abandoned.

A further object of this invention is to provide a tire chain applicator which has means for adjusting it for use in applying a chain to practically any size automobile or truck tire and which will positively hold the tire in proper relation to the tire chain to enable the tire chain to be readily placed in position on the tire.

A further object of this invention is to provide a tire chain applicator having means for properly locating the tire chain in relation to the tire while the tire is driven onto the applicator as well as means for preventing the tire chain applicator from being readily displaced during the process of driving the tire onto the applicator.

Still a further object of this invention is to provide an adjustable stop means for assuring that the tire will come to a stop in proper position relative to the tire chain previously engaged thereon, so that the tire chain may thereafter be readily draped about the tire and coupled thereon and then readily removed from the applicator by backing off the tire therefrom.

Still a further object of this invention is to provide a tire chain applicator wherein the tire is to be driven onto the applicator and wherein the applicator will not readily skid or slide out of position even though it is being used on snow or ice or other slippery surface.

With the foregoing and other objects in view, this invention comprises the combination, construction and arrangement of parts hereinafter set forth, claimed and disclosed in the accompanying drawings, wherein:

Fig. 1 is a side plan view of the tire chain applicator of this invention showing a tire on which a tire chain has just been applied;

Fig. 2 is a schematic view showing how the tire chain applicator of this invention may be adjusted to fit different size tires;

Fig. 3 is a longitudinal sectional view on line 3—3 of Fig. 4;

Fig. 4 is a bottom plan view of the tire chain applicator;

Figs. 5, 6, 7 and 8 are transverse sectional views on lines 5—5, 6—6, 7—7 and 8—8 of Fig. 3;

Fig. 9 is an end elevational view with the adjustable stop omitted, and

Fig. 10 is a top plan view.

The tire chain applicator of this invention as shown at 10 consists of two elements, a chain and tire supporting ramp 11 and an adjustable tire stop 12 therefor, both parts being made of any suitable metal material, preferably pressed or cast aluminum, aluminum alloys or magnesium, whereby the applicator 10 may be of sufficient strength, yet of minimum weight.

The chain and tire holder ramp 11 is substantially rectangular in bottom plan view as shown in Fig. 4 and has depending side walls 14, a forward or approach side wall 15 and an end wall 16. Integrally formed along the entire length of both end walls 15 and 16 and along the end edges of the side walls 14 are a plurality of serrated teeth 17 so as to cause the applicator 10 to dig into and grip the supporting surface even though it may be slippery ice or snow. To insure this firm gripping on a slippery surface, the side walls 14 do not have any serrations in their midportions but are somewhat elevated at the midportions as at 20 so that when the weight of a tire and portion of the automobile or truck is located on the ramp 11, the serrated teeth 17 will dig into and grip firmly on any supporting surface.

As will be observed, the side walls 14 converge slightly toward each other as they approach the upper supporting surfaces of the ramp 11. The upper supporting surfaces of the ramp 11 include an angular or inclined approach surface portion 21 and a horizontal surface portion 22. Such supporting surface portions 21 and 22 are each somewhat hollowed in transverse section as will be apparent from Figs. 5 to 9 inclusive, so as to conform with the usual rounded surface of a tire. Midway in each supporting surface portions 21 and 22 is located a transverse groove 23 and 24 of sufficient width and depth to receive a tire chain cross-link therein, the grooves 23 and 24 being spaced apart a distance so that adjacent cross-links of a tire chain 25 may be placed therein. Anti-skid ribs 26 are provided along the entire supporting surface, both on the inclined portions 21 and the horizontal portion 22 and these ribs 26 may be simple transverse ribs as shown or may be made in any decorative design, including the use of lettering if desired. The bottom walls of the grooves 23 and 24 are each reinforced, the bottom wall of groove 23 being thickened and formed into a tooth 27 extending entirely across the width of the ramp 11, while the bottom wall of the groove 24 is provided with a bridging rib 28 which also extends at 29 along the inner side of the side walls 14.

The tire stop 12 includes a horizontal arm 30 rectangular in cross section and connected by a curved portion 31 to a substantially upright leg 32 having a rounded top edge 33, and a supporting foot 34 having a strengthening angular wall 35 depends down below the vertical leg 32. The bottom walls 36 of the horizontal arm 30 are notched as at 37 so as to cooperate with the lower edge 38 of an open window 40 provided in the upper sloping portion 41 of the rear wall 17, the window 40 being of such size that the horizontal arm 30 may be inserted therethrough when the stop 12 is held at a slight angle and then the notch 37, selected according to the size desired, is hooked over the upper edge of the vertical portion of the wall 17.

In operation the stop member 12 will be placed in cooperation with the ramp 11 by inserting the horizontal arm 30 through the window 40 according to the size of the tire 44 on which the chain 25 is to be mounted. If the tire 44 is of small size as at 42, the stop 12 will be inserted to the last notch as shown in Fig. 2, while if the tire is a large size tire as at 43, the stop 12 will be inserted only to the first notch. For an intermediate size tire at 44, the middle notch 37 on the horizontal arm 30 will be engaged with the window ledge 38. After thus placing the stop 12 in cooperative position with the ramp 11, the chain applicator 10 will be laid on the ground or snow or ice in the path of the tire 44, sufficiently in advance thereof to permit the tire chain 25 to have two adjacent cross-links placed in the cross-link notches 23 and 24. The tire chain 25 is then stretched out and the tire 44 is driven forward over the inclined surface 21 onto the horizontal surface 22 at a very slow speed so that the stop 33 will stop the forward advance of the tire 44, as shown in Fig. 1. The tire chain 25 is then draped about the tire 44 and coupled in the usual manner. Thereafter the vehicle on which the tire is mounted may be backed up to remove it from the applicator and the process repeated with the tire chains for such other wheels on the vehicle that it is desired to apply the chains to. Due to the lightness of the material from which the applicator is made it may be easily handled and carried on the vehicle, occupying a minimum amount of space and a minimum amount of weight. The presence of the adjustable stop 33 enables the same applicator to be used for practically any size tire, thus facilitating its use as a garage tool. The provision of the foot 34 prevents any tilting action of the ramp or the stop when the tire abuts the rounded top edge 33 of the vertical leg 32 and the serrated teeth 17 on the bottom edge of the walls enables the tire to mount the ramp readily and prevents the ramp from skidding out of position as the tire is being driven thereon.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A tire chain applicator comprising a ramp and a stop member adjustably attachable thereto, said ramp including an inclined approach section and a horizontal supporting surface connected thereto, and a transverse chain cross-link receiving groove in each said inclined approach section and said horizontal supporting surface, said stop member including a vertically extending leg having a rounded edge, a supporting foot therebelow, and a forwardly extending horizontal arm having a notched lower edge, the portion connecting said horizontal arm to said vertical leg being arcuate and providing a third cross-link receiving space thereover, the rear of said ramp having an open window to receive said horizontal arm therethrough and having a window ledge to cooperate with said notched edge of said horizontal arm.

2. A tire chain applicator comprising an integrally formed ramp member and a stop member adjustably attachable thereto, said ramp member comprising a horizontal upper surface and a connected inclined approach surface, said surface being concave in transverse cross-section, a tire chain cross-link receiving groove extending transversely across each of said inclined surface and said horizontal surface, outwardly flaring supporting side walls extending downwardly from the outer transverse edges of said surfaces, skid preventing teeth extending along the bottom edge of said supporting walls at least adjacent their front and rear ends, and reinforcing ribs on the bottom of said transverse cross-link grooves, said rib of said inclined surface groove extending downwardly and formed into a serrated anti-skid tooth, said rib on the bottom of said other groove extending downwardly along the inner surfaces of said side wall, said ramp having a sloping rear wall at the end of said horizontal surface remote from said inclined surface merging into a vertical supporting wall, an open window in said sloping rear wall extending to said vertical wall portion, said stop member having a horizontal arm U-shaped in inverse cross-section arranged to extend through said open window, a plurality of notches in the lower edges of said arm arranged to adjustably engage with the window ledge formed at the upper end of said vertical rear wall, said stop member also including a vertically extending leg merging into a rounded top edge at the top end and a depending supporting foot at the bottom end, the portion connecting said horizontal arm to said vertical leg being arcuate and providing a third cross link receiving space thereover.

JOHN H. RHOADS.
LOUIS F. HORVATH.

REFERENCES CITED

The following references are of record in the file of this patent:

UNITED STATES PATENTS

| Number | Name | Date |
|---|---|---|
| 1,189,632 | Seitz | July 4, 1916 |
| 1,243,574 | Wood | Oct. 16, 1917 |
| 1,400,478 | Deschamps | Dec. 13, 1921 |
| 1,448,250 | Miller | Mar. 13, 1923 |
| 1,548,189 | Costello | Aug. 4, 1925 |
| 2,279,464 | Jackson | Apr. 14, 1942 |
| 2,450,648 | Felzer | Oct. 5, 1948 |

FOREIGN PATENTS

| Number | Country | Date |
|---|---|---|
| 594,266 | Great Britain | Nov. 6, 1947 |